(12) United States Patent
Snell

(10) Patent No.: US 11,371,526 B2
(45) Date of Patent: Jun. 28, 2022

(54) KEYLESS IMPELLER SYSTEM AND METHOD

(71) Applicant: Johnson Controls Technology Company, Auburn Hills, MI (US)

(72) Inventor: Paul William Snell, York, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 14 days.

(21) Appl. No.: 16/650,353

(22) PCT Filed: Sep. 25, 2018

(86) PCT No.: PCT/US2018/052706
§ 371 (c)(1),
(2) Date: Mar. 24, 2020

(87) PCT Pub. No.: WO2019/067465
PCT Pub. Date: Apr. 4, 2019

(65) Prior Publication Data
US 2020/0300262 A1 Sep. 24, 2020

Related U.S. Application Data

(60) Provisional application No. 62/610,785, filed on Dec. 27, 2017, provisional application No. 62/563,968, filed on Sep. 27, 2017.

(51) Int. Cl.
*F04D 29/05* (2006.01)
*F04D 29/28* (2006.01)
(Continued)

(52) U.S. Cl.
CPC ......... *F04D 29/284* (2013.01); *F04D 29/053* (2013.01); *F04D 29/20* (2013.01);
(Continued)

(58) Field of Classification Search
CPC ........ F04D 17/10; F04D 29/053; F04D 29/20; F04D 29/266; F04D 29/284;
(Continued)

(56) References Cited

U.S. PATENT DOCUMENTS 3,061,342 A * 10/1962 Feller ............... F04D 29/266
403/15
3,358,772 A * 12/1967 Bunyan ............ F16D 1/097
416/204 R
(Continued)

FOREIGN PATENT DOCUMENTS

| CN | 101725563 A | 6/2010 |
| CN | 102803736 A | 11/2012 |

(Continued)

OTHER PUBLICATIONS

Machinery's Handbook 29th Edition, Erik Oberg, Franklin D. Jones, Holbrook L. Horton, and Henry H Ryffel, 2012 Industrial Press, New York, p. 2252. (Year: 2012).*

(Continued)

*Primary Examiner* — Ninh H. Nguyen
(74) *Attorney, Agent, or Firm* — Fletcher Yoder, P.C.

(57) ABSTRACT

A compressor for a heating, ventilating, air conditioning, and refrigeration (HVAC&R) unit includes an impeller, a shaft configured to rotate the impeller, and a fastener. The impeller includes an opening and does not include keys, splines, pins, or any combination thereof. The fastener is coupled to an end of the shaft and extends through the opening of the impeller, and the fastener is configured to stretch in an axial direction relative to the shaft via a tensioner during assembly of the compressor.

18 Claims, 7 Drawing Sheets

(51) Int. Cl.
  *F04D 29/053* (2006.01)
  *F16D 1/06* (2006.01)
  *F04D 29/20* (2006.01)
  *F04D 17/10* (2006.01)
  *F04D 29/26* (2006.01)
  *F16D 1/076* (2006.01)

(52) U.S. Cl.
  CPC ............... *F16D 1/06* (2013.01); *F04D 17/10* (2013.01); *F04D 29/266* (2013.01); *F05D 2230/60* (2013.01); *F05D 2240/60* (2013.01); *F05D 2250/51* (2013.01); *F05D 2260/31* (2013.01); *F16D 1/076* (2013.01)

(58) Field of Classification Search
  CPC ............. F05D 2230/60; F05D 2240/60; F05D 2250/51; F05D 2260/31; F16D 1/06
  See application file for complete search history.

(56) References Cited

U.S. PATENT DOCUMENTS

| | | | | |
|---|---|---|---|---|
| 3,549,275 | A * | 12/1970 | Laskey | B63H 23/34 |
| | | | | 416/245 A |
| 4,191,485 | A * | 3/1980 | Samurin | B63H 1/20 |
| | | | | 29/252 |
| 4,872,817 | A * | 10/1989 | De Kruif | F01D 5/025 |
| | | | | 417/407 |
| 6,962,099 | B2 * | 11/2005 | Slepekis | B25B 13/14 |
| | | | | 81/126 |

FOREIGN PATENT DOCUMENTS

| | | |
|---|---|---|
| JP | S5560603 A | 5/1980 |
| JP | 2007503557 A | 2/2007 |
| JP | 2008133745 A | 6/2008 |
| JP | 2011528766 A | 11/2011 |
| JP | 2011256858 A | 12/2011 |
| JP | 2017125434 A | 7/2017 |
| JP | 2017150316 A | 8/2017 |
| KR | 20140005511 A | 1/2014 |
| WO | 03048527 A1 | 6/2003 |

OTHER PUBLICATIONS

International Search Report and Written Opinion for PCT Application No. PCT/US2018/052706 dated Dec. 12, 2018, 53 pgs.
Chinese Office Action for CN Application No. 201880076148.X dated Nov. 6, 2020, 8 pgs.
Japanese Office Action for JP Application No. 2020-518059, dated Apr. 30, 2021, 7 pgs.
Korean Office Action for KR Application No. 10-2020-7011669, dated May 20, 2021, 6 pgs.
Chinese Office Action for CN Application No. 201880076148.X, dated Jun. 18, 2021, 6 pgs.
Korean Office Action for KR Application No. 10-2020-7011669, dated Nov. 23, 2021, 4 pgs.
Japanese Office Action for JP Application No. 2020-518059, dated Dec. 10, 2021, 7 pgs.
Korean Office Action for KR Application No. 10-2020-7011669, dated Feb. 17, 2022, 4 pgs.

* cited by examiner

KEYLESS IMPELLER SYSTEM AND METHOD

CROSS REFERENCE TO RELATED APPLICATIONS

This application is a U.S. National Stage Application of PCT International Application No. PCT/US2018/052706, entitled "KEYLESS IMPELLER SYSTEM AND METHOD," filed Sep. 25, 2018, which claims priority from and the benefit of U.S. Provisional Application Ser. No. 62/563,968, entitled "KEYLESS IMPELLER SYSTEM AND METHOD," filed Sep. 27, 2017, and U.S. Provisional Application Ser. No. 62/610,785, entitled "KEYLESS IMPELLER SYSTEM AND METHOD," filed Dec. 27, 2017, which are hereby incorporated by reference in their entireties for all purposes.

BACKGROUND

This application relates generally to vapor compression systems incorporated in air conditioning and refrigeration applications, and, more particularly, to an impeller system for a vapor compression system.

Vapor compression systems are utilized in residential, commercial, and industrial environments to control environmental properties, such as temperature and humidity, for occupants of the respective environments. The vapor compression system circulates a working fluid, typically referred to as a refrigerant, which changes phases between vapor, liquid, and combinations thereof in response to being subjected to different temperatures and pressures associated with operation of the vapor compression system. For example, the vapor compression system utilizes a compressor to circulate the refrigerant to a heat exchanger which may transfer heat between the refrigerant and another fluid flowing through the heat exchanger. The compressor includes a shaft that drives rotation of an attached impeller to facilitate circulation of the refrigerant. The impeller is coupled to the shaft via keys, pins, or splines, which may be difficult to machine due to manufacturing tolerances.

SUMMARY

In one embodiment, a compressor for a heating, ventilating, air conditioning, and refrigeration (HVAC&R) unit, includes an impeller, a shaft configured to rotate the impeller, and a fastener. The impeller includes an opening and does not include keys, splines, pins, or any combination thereof. Then fastener is coupled to an end of the shaft and extends through the opening of the impeller, in which the fastener is configured to stretch in an axial direction relative to the shaft via a tensioner during assembly of the compressor.

In another embodiment, a method of coupling an impeller to a shaft for a compressor includes inserting a fastener through an opening of the impeller, in which a first end of the fastener is coupled to a second end of the shaft, coupling a nut to a third end of the fastener such that the nut is disposed against a surface of the impeller, stretching the fastener in an axial direction away from the shaft, and tightening the nut along the fastener while the fastener is in a stretched position.

In another embodiment, a system to couple an impeller to a shaft of a compressor includes a fastener configured to couple to an end of the shaft at a first end of the fastener, a nut configured to couple to the fastener at a second end of the fastener, and a tensioner configured to stretch the fastener, in which the tensioner is configured to be disposed against a surface of the impeller. The fastener is a threaded stud, a tie bolt, or any combination thereof.

DETAILED DESCRIPTION

Figure 1:
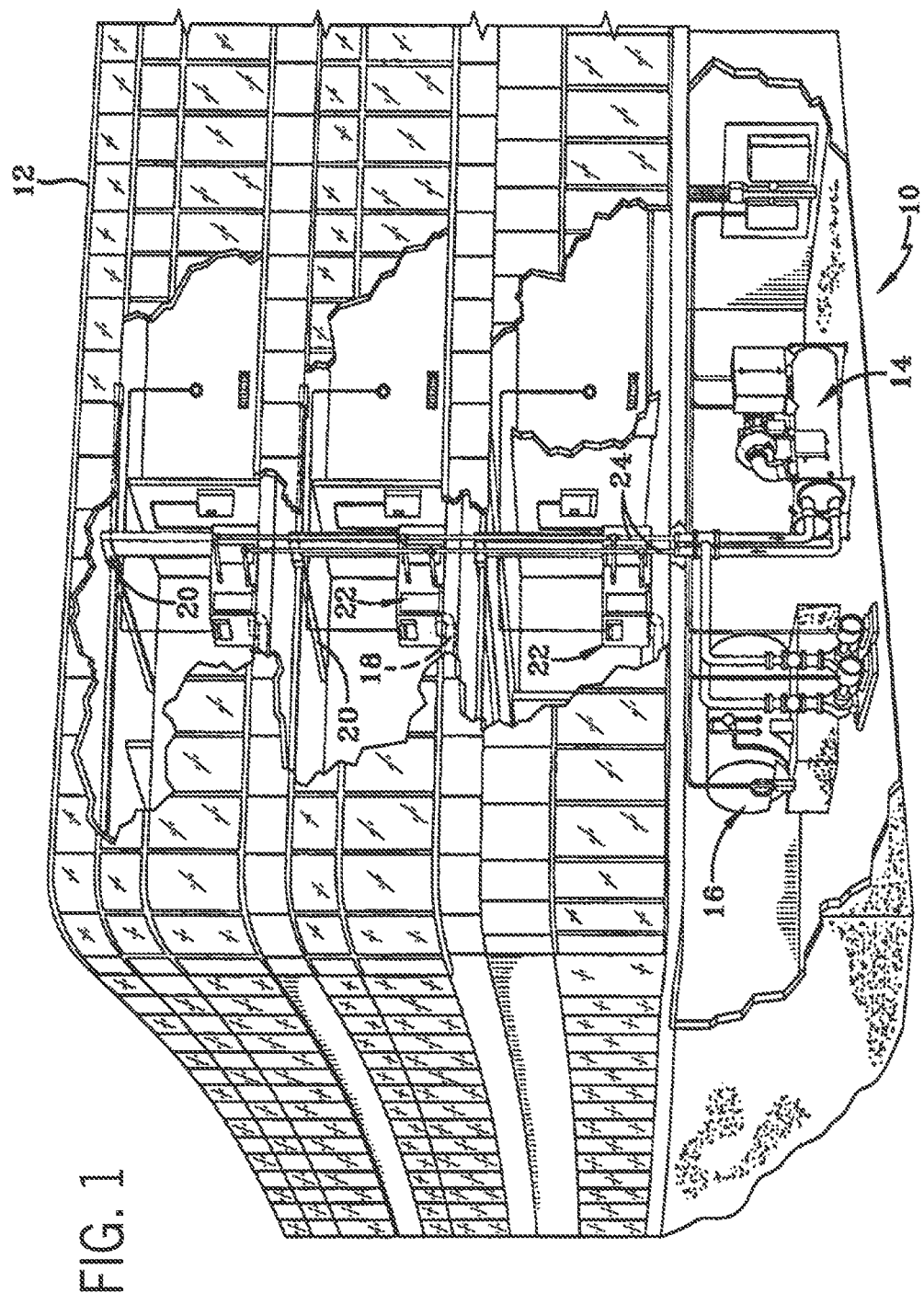
FIG. 1 is a perspective view of an embodiment of a building that may utilize a heating, ventilation, air conditioning, and refrigeration (HVAC&R) system in a commercial setting, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed towards a heating, ventilating, air conditioning, and refrigeration (HVAC&R) system that uses a compressor to circulate refrigerant through a refrigerant loop. The compressor may be coupled to a condenser of the HVAC&R system along the refrigerant loop. The compressor may compress the refrigerant to increase a pressure of the refrigerant and direct the refrigerant to the condenser. The refrigerant may flow towards the condenser of the HVAC&R system where it may transfer heat to a working fluid in the condenser. In some embodiments, the compressor may be a centrifugal compressor and include an impeller that rotates at a relatively high speed to circulate and compress the refrigerant.

In a centrifugal compressor, the impeller may impart a centrifugal force on the refrigerant to enable compression of the refrigerant.

The impeller of a centrifugal compressor may be coupled to a shaft that is rotated at a high speed by a motor. Typically, the impeller is coupled to the shaft via keys, splines, pins, or a combination thereof, which transfers torque from the shaft to the impeller. Thus, the impeller rotates as the shaft rotates. However, machining the impeller and the shaft to accommodate the keys, splines, or pins may be complex, expensive, and time-consuming. Since the impeller rotates at a high speed, the keys, splines, or pins may be machined such that the rotation of the shaft does not cause excess stress on the impeller. For example, machining the keys, splines, or pins may be precise enough to enable the impeller to couple to the shaft without interference from keys, splines, or pins. As such, there may be difficulties that arise during machining to achieve such precision. In addition, assembly of existing systems may include coupling the impeller onto the shaft while imparting torque onto the shaft, thereby blocking rotation of the shaft. As such, the shaft may be kept in place to facilitate the coupling process, which may further enhance complexity of assembly.

In accordance with certain embodiments of the present disclosure, it is now recognized that a new method of coupling the impeller onto the shaft may facilitate assembly of the compressor. That is, a method that does not use keys, splines, or pins to couple the impeller onto the shaft may reduce assembly time and/or costs of fabrication and assembly of the compressor.

To this end, embodiments of the present disclosure are directed to a shaft that may thread to a fastener, such that a first end of the fastener is coupled to the shaft. An opening of an impeller may be positioned over a second end of the fastener so that the impeller (e.g., a surface of the impeller) abuts a face of the shaft. A nut may couple to a remaining length of the fastener to clamp the impeller to the shaft. A tensioner (e.g., a hydraulic tensioner) may facilitate securement of the nut to the fastener and apply a predetermined amount of force between the impeller and the shaft. As used herein, a tensioner refers to any device or mechanism configured to apply a force that stretches the fastener in an axial direction defining the fastener and/or the shaft. Although the present disclosure primarily focuses on the use of a hydraulic tensioner, it should be appreciated that other types of devices, such as a mechanical tensioner, an electrical tensioner, another suitable device configured to apply an axial force to the fastener, or any combination thereof, may be utilized to stretch the fastener and enable the nut to be further tightened onto the fastener. In this manner, machined keys, splines, or pins may be eliminated, and torque applied to the shaft may no longer be utilized during assembly to facilitate securing the nut onto the fastener. This method may also enable the impeller to be more aerodynamic. For example, the impeller may include a single opening through a center of the impeller, which may reduce a resistance of the refrigerant flow when compared to impellers that include keys, splines, and/or pins. Furthermore, the absence of keys, splines, and/or pins may reduce the moment of inertia of the assembly to facilitate rotation of the impeller. As such, a higher efficiency of the compressor may be achieved, which may reduce energy costs.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
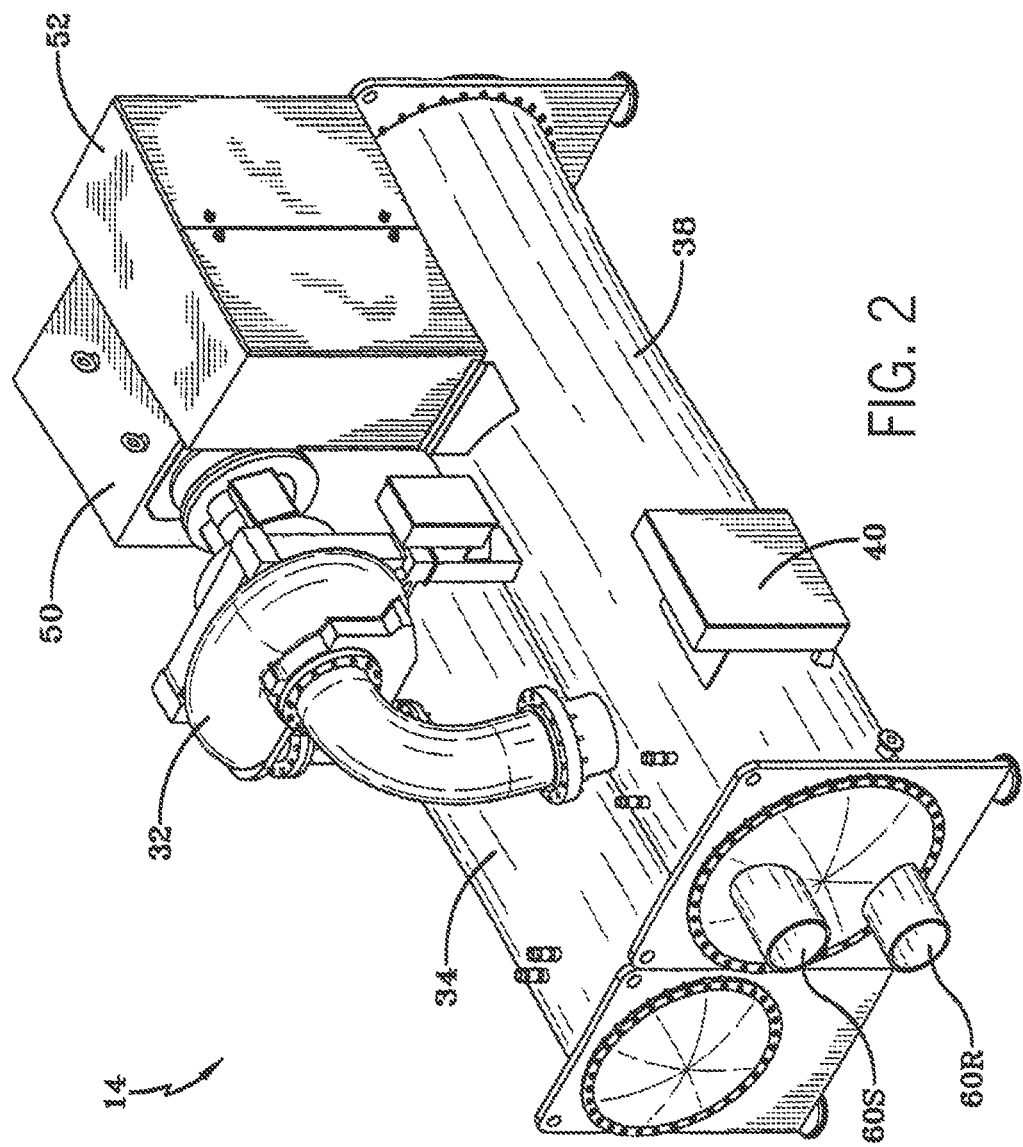
FIG. 2 is a perspective view of a vapor compression system, in accordance with an aspect of the present disclosure.
Figure 3:
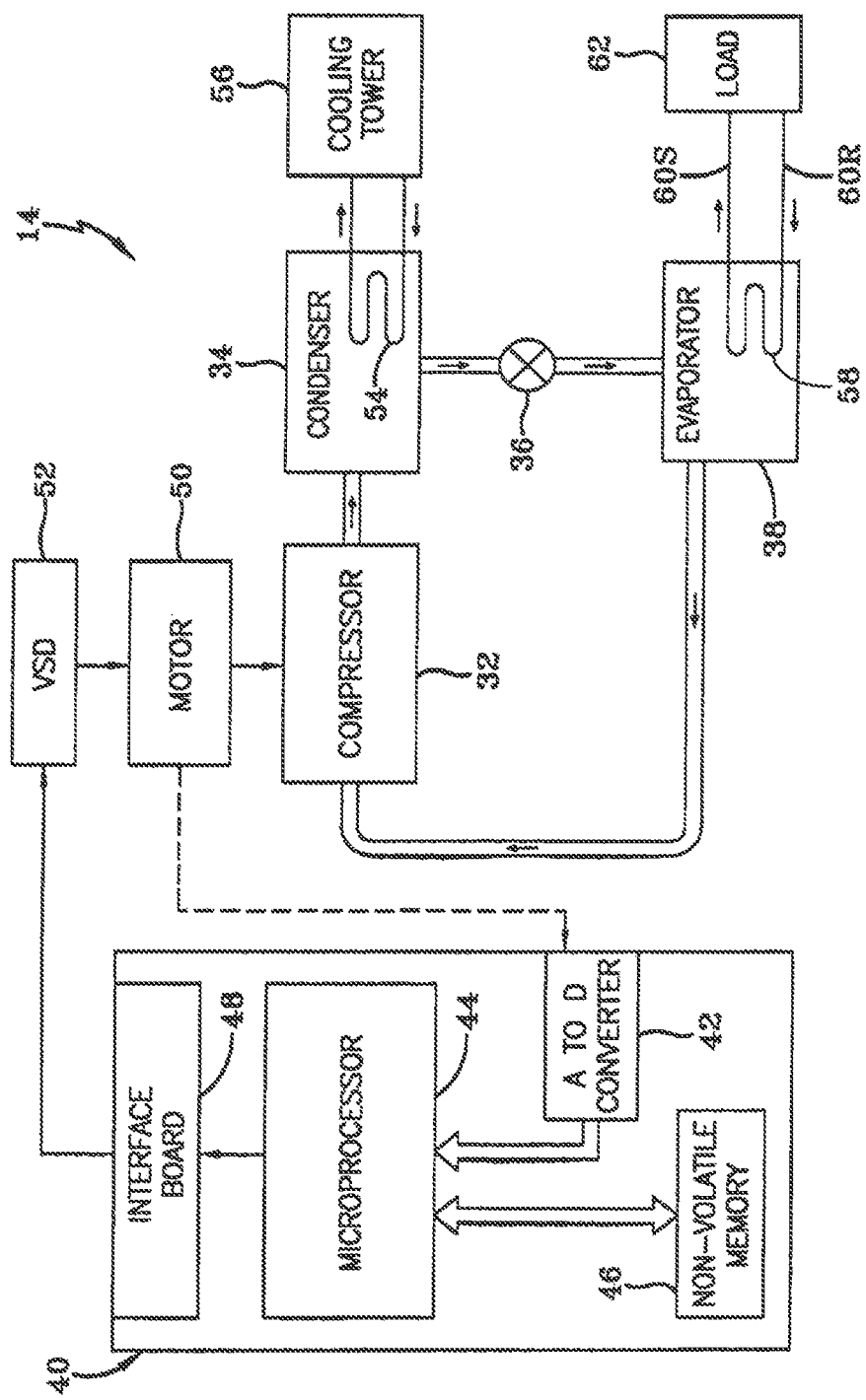
FIG. 3 is a schematic of an embodiment of the vapor compression system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
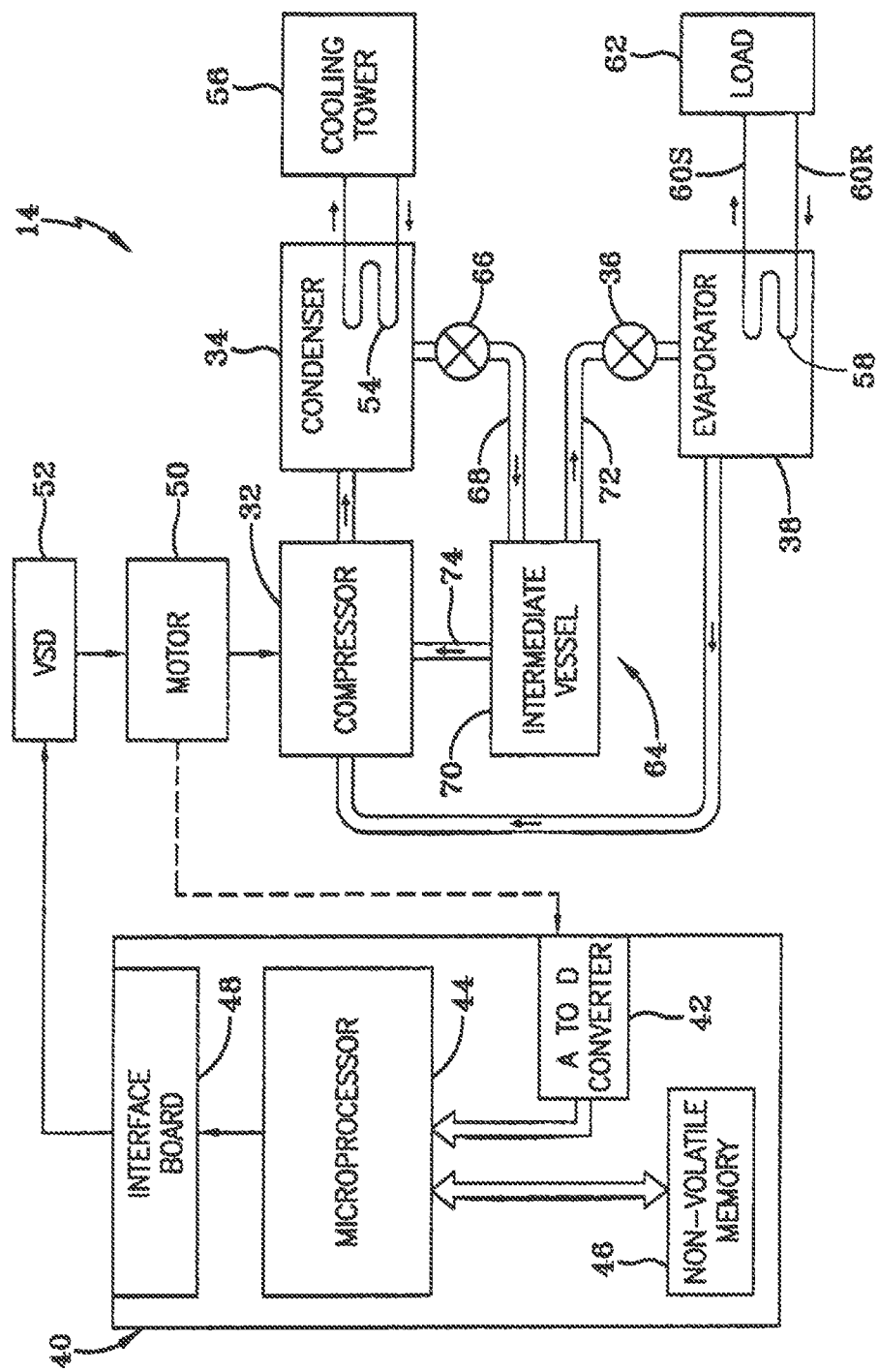
FIG. 4 is a schematic of an embodiment of the vapor compression system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

As noted above, a compressor, such as the compressor 32, may use an impeller to enable the circulation of refrigerant through the vapor compression system 14. For example, the impeller may contain blades that, during rotation, draw in refrigerant towards the center of the impeller and into the compressor 32. The impeller may impart centrifugal force on the refrigerant such that a velocity and kinetic energy of the refrigerant increases as the refrigerant flows through a compressor housing. The high velocity refrigerant is directed into a diffuser which may convert the kinetic energy of the refrigerant into pressure, thereby compressing the refrigerant. In some embodiments, the impeller may couple to a rotating shaft of the compressor, such that the shaft drives rotation of the impeller. The present disclosure includes an improved method of securing the impeller to the shaft. For example, the method may include coupling a fastener to one end of the shaft, such as via threads, inserting the fastener into an opening through a center of the impeller, and threading a nut onto the fastener to clamp the shaft and impeller to one another. The method may also include using a tensioner to thread the nut on the fastener and apply a predetermined amount of force between the impeller and the shaft.

Figure 5:
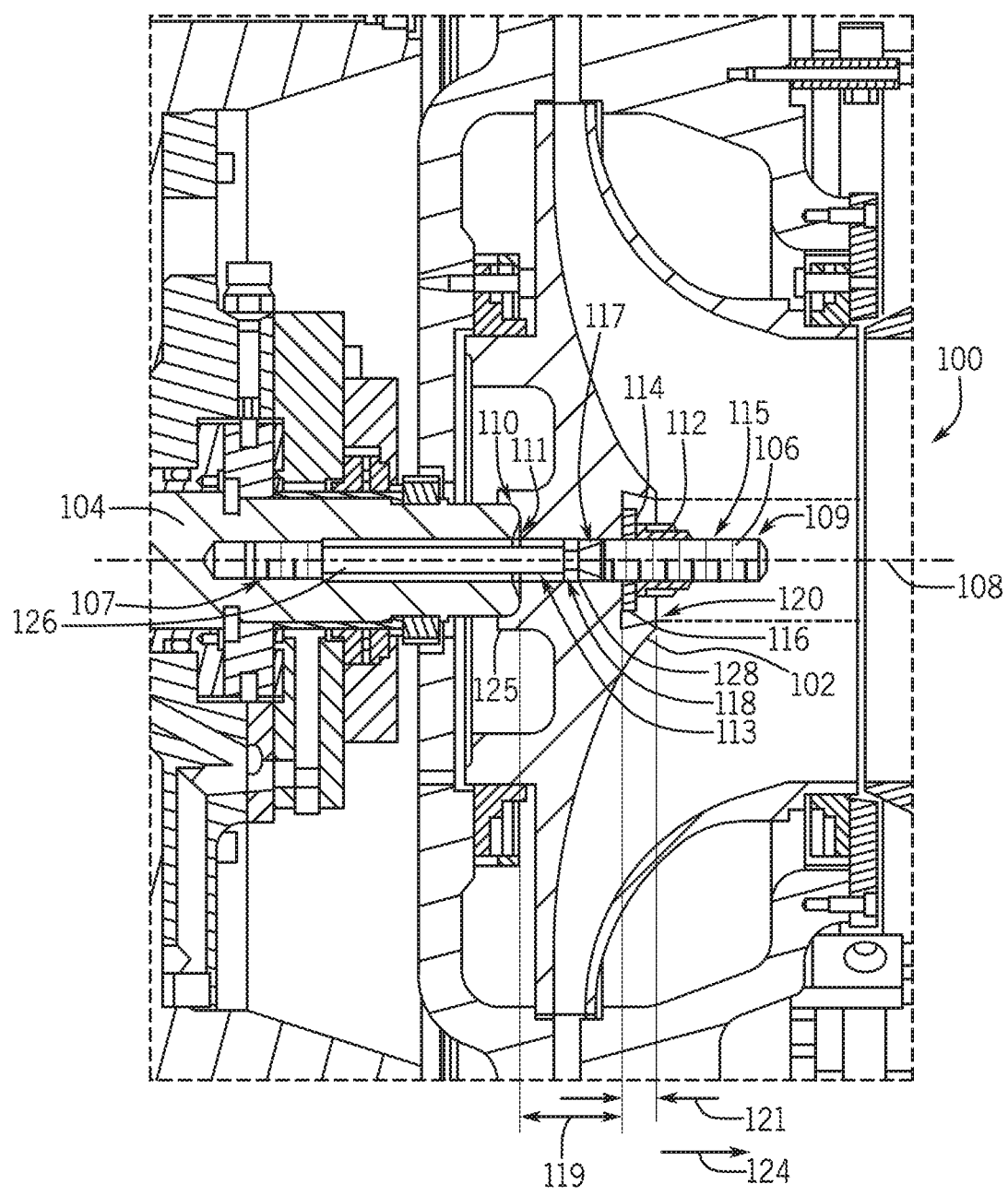
FIG. 5 is a sectional view of an embodiment of a compressor impeller assembly utilized in the vapor compression system of FIGS. 2-4, in accordance with an aspect of the present disclosure.

FIG. 5 is a sectional side view of an embodiment of an impeller assembly 100. As shown in the illustrated embodiment of FIG. 5, the impeller assembly 100 includes an impeller 102, a shaft 104, and a fastener 106. In some embodiments, the shaft 104 and the fastener 106 may each be cylindrical in shape, where the fastener 106 is smaller in diameter when compared to the shaft 104. The fastener 106 may contain external or male threads on a first end 107 and a second end 109. On an end 111 of the shaft 104, there may be a shaft opening 113 with internal or female threads, such that the first end 107 of the fastener 106 may be inserted and threaded into the shaft opening 113. When the fastener 106 is fully inserted into or threaded onto the shaft 104, at least a portion 115 of a length of the fastener 106 may be exposed. That is, when the fastener 106 and the shaft 104 are coupled to one another, the second end 107 of the fastener 106 may not be inserted into the shaft opening 113 and remain exposed.

The second end 109 of the fastener 106 may be inserted into an opening 117 extending through a center of the impeller 102. In some embodiments, the impeller 102 may be made from aluminum or an aluminum alloy to increase a strength of the impeller 102 and enable the impeller 102 to withstand operating conditions in the compressor, while maintaining a relatively low weight. The impeller 102 may contain the opening 117 that extends through a body of the impeller 102, such that the fastener 106 may be disposed within and support the impeller 102. In some embodiments, the opening 117 may extend through a center of the impeller 102. The opening 117 may also include sections having different diameters as the opening 117 extends through the impeller 102 along an axis 108.

For example, the opening 117 may include a first diameter portion 118 that may extend for a first length 119 of the impeller. Additionally, the opening 117 may include a second diameter portion 120 of the opening that may extend for a second length 121 of the impeller 102. The second diameter portion 120 may be of a larger diameter relative to the first diameter portion 118. A portion of the fastener 106 may be inserted into the first diameter portion 118. When the fastener 106 is inserted into the opening 117, a surface 110 of the shaft 104 may contact the impeller 102. The impeller 102 may contain a lip 125 that acts as an interface between the impeller 102 and the surface 110. As such, the shaft 104 may be substantially aligned with the impeller 102. In other words, the shaft 104, the impeller 102, and the fastener 106 are all aligned coaxially with one another along the axis 108.

Additionally or alternatively, a friction modifier may be disposed on the surface 110 to enhance a torque capacity of the impeller 102. For example, a coefficient of friction between the impeller 102 and shaft 104 may increase by disposing a friction modifier material on the surface 110. In some cases, the coefficient of friction between the impeller 102 and the shaft 104 decreases when a liquid (e.g., water, oil, or a lubricant) is present on the surface 110. The coefficient of friction may decrease between 1% and 50%, between 5% and 30%, or between 15% and 25% when compared to conditions where liquid is not present on the surface 110 (e.g., dry conditions). Including the friction modifier (e.g., silicon carbide or diamond particles) on the surface 110 may increase the coefficient of friction between the impeller 102 and the shaft 104 when compared to dry conditions, regardless of whether liquid is present on the surface 110. For example, the friction modifier may act as keys on the surface 110 between the impeller 102 and the shaft 104 to thereby increase the coefficient of friction at the surface 110. In some embodiments, the friction modifier may be sprayed onto the surface 110 in liquid form and/or in gel form. Additionally or alternatively, the friction modifier may be applied to the surface 110 as a powder using an adhesive. In any case, the friction modifier is compressed at the surface 110 to enhance the coefficient of performance at the surface 110 between the impeller 102 and the shaft 104. Accordingly, the torque capacity of the impeller 102 is increased.

When inserted, a portion of the fastener 106 may extend past the second diameter portion 120 of the opening 117, such that at least a portion 115 of the threads on the second end 109 of the fastener 106 are accessible through the second diameter portion 120 of the opening 117. The second diameter portion 120 of the opening 117 may enable a nut 112 and a washer 114 to be disposed over and/or coupled to the second end 109 of the fastener 106. The transition from the first diameter portion 118 to the second diameter portion 120 may form a mounting surface 116 for the washer 114 and/or the nut 112 against the impeller 102. The washer 114 may press against the mounting surface 116 the nut 112 and the fastener 106 are secured to one another via threading. Additionally, the nut 112 may clamp down onto the washer 114 to apply a force against the impeller 102 and to secure the impeller 102 onto the shaft 104.

After initial coupling of the components, the fastener 106 may be stretched (e.g., elastically deformed) along the axis 108 in a direction 124 to secure the impeller 102 to the shaft 104 and to apply a predetermined amount of force between the impeller 102 and the shaft 104. In some embodiments, the fastener 106 and the nut 112 may be designed in a specific manner. For example, stretching the fastener 106 may also stretch the threads of the fastener 106, such that adjacent threads along the fastener 106 are spaced further from one another upon stretching. Thus, the threads on the fastener 106 and the nut 112 may each contain a non-standard pitch to enable the nut 112 to be threaded onto the fastener 106 when the fastener 106 is stretched. That is, the nut 112 may contain threads to accommodate the increased spacing between adjacent threads of the fastener and to enable the nut 112 to be further tightened onto the fastener 106 when the fastener 106 is in a stretched position.

Moreover, the fastener 106 may include a body portion 126 that lacks threads. The body portion 126 may include a smaller diameter than the threaded first and second ends 107, 109, such that during the stretching of the fastener 106, the tensile stresses produced from stretching are concentrated in the body portion 126. Concentrating the stress at the body portion 126 avoids stripping the threads at the first and second ends 107, 109 of the fastener 106 during stretching.

Furthermore, the fastener 106 may contain a neck portion 128 (e.g., a portion of the body portion 126) having an increased diameter to maintain contact with a surface within the opening 117 of the impeller 102. That is, the majority of the body portion 126 of the fastener 106 has a diameter that is less than the diameter of the first diameter portion 118 of the impeller 102. However, the neck portion 128 may be sized to maintain contact with the walls of the first diameter portion 118 of the opening 117, such as with a slip fit interface. The neck portion 128 thus ensures that the fastener 106 remains substantially centered in the opening 117 of the impeller 102 during stretching.

Furthermore, the fastener 106, the shaft 104, the washer 114, and the nut 112, may be made from high strength steel, such as a steel alloy. High strength steel may increase strength of the impeller assembly 100 and enable the impeller assembly 100 to withstand the forces that may come from both the stretching of the fastener 106 and the operation of the compressor. The body portion 126 and the neck portion 128 of the fastener 106; the material of the fastener 106, the shaft 104, the washer 114, and the nut 112; and the non-standard pitch of the fastener 106 and the nut 112 may increase longevity of the fastener 106, the shaft 104, the washer 114, and the nut 112 during the stretching conditions and operating conditions of the compressor.

Figure 6:
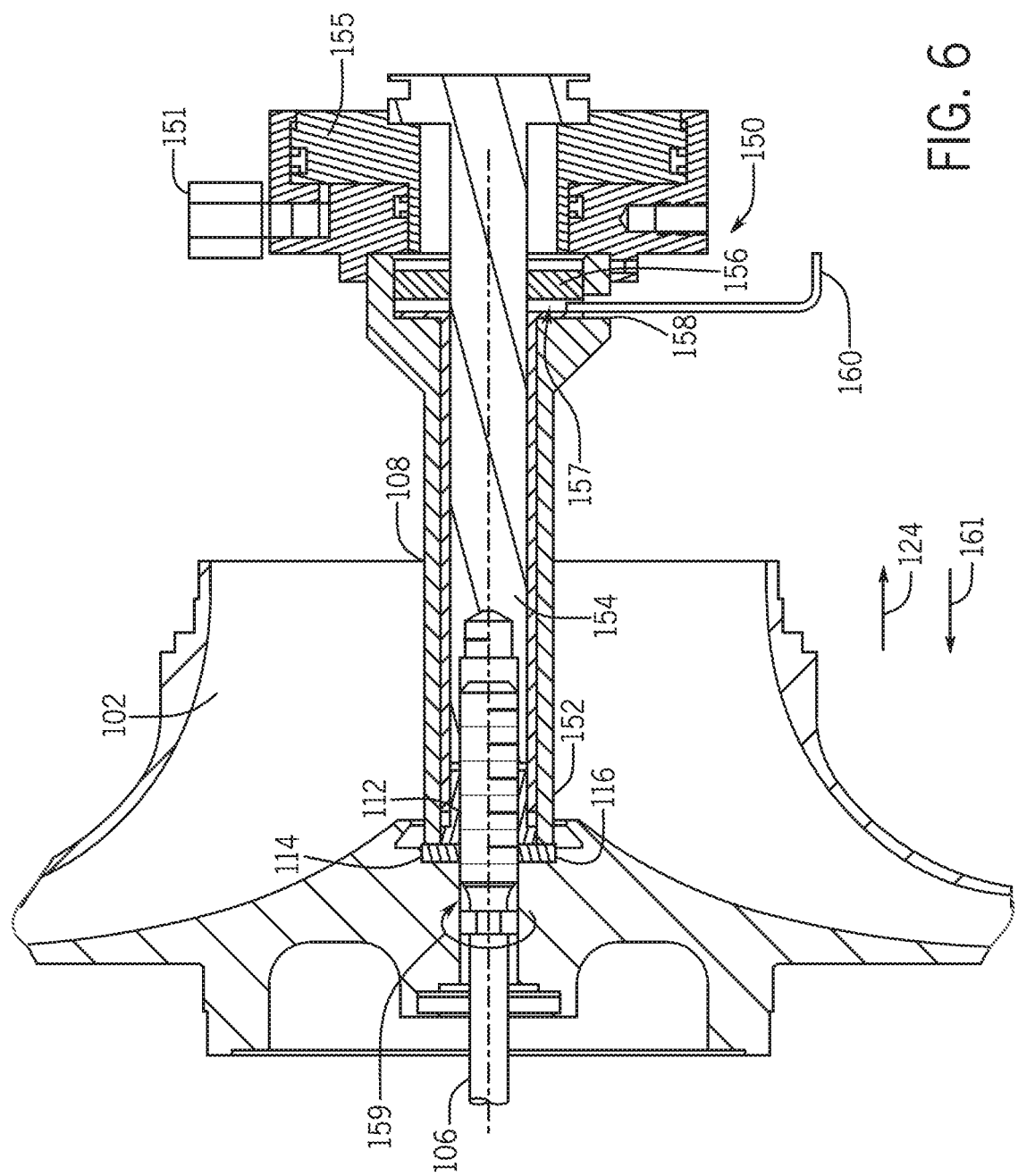
FIG. 6 is a sectional view of an embodiment of a tensioner utilized to couple the impeller of FIG. 5 to a shaft of a compressor, in accordance with an aspect of the present disclosure.

FIG. 6 is a sectional view of an embodiment of a device that may be used to stretch the fastener 106. As shown in the illustrated embodiment of FIG. 6, a tensioner 150 is coupled to the impeller 102 and the fastener 106. The tensioner 150 may be partially inserted into the opening 117 (e.g., the second diameter portion 120) of the impeller 102. The tensioner 150 may include a shell 152 that contacts the washer 114 when the tensioner 150 is fully inserted over the fastener 106. As such, the portion 115 of the fastener 106 may be fully inserted into the tensioner 150. Within the shell 152, the tensioner 150 may contain a grip 154 that secures onto the second end 109 of the fastener 106 via threads, for example. When the tensioner 150 is positioned against the impeller 102, the grip 154 may be able to move in an axial direction. For example, the grip 154 may move in the direction 124 and stretch the fastener 106 in the direction 124. In some embodiments, the tensioner 150 may be a hydraulic tensioner and fluid may be used to move the grip 154 in the direction 124. For example, a hydraulic fluid source (not pictured) may be coupled to the tensioner 150 at an inlet 151 and supply fluid through the inlet 151 into the tensioner 150 to direct a member 155 in the direction 124 to drive movement of the grip 154 in the direction 124.

Furthermore, the shell 152 may contain a tightening element 156 that attaches to the nut 112 and may be configured to rotate the nut 112 in a circumferential direction 159 about the axis 108. Accordingly, the tightening element 156 is utilized to thread the nut 112 onto the fastener 106. For example, as the grip 154 directs (e.g., stretches) the fastener 106 in the direction 124, the tightening element 156 is rotated in the circumferential direction 159 to tighten the nut 112 on the fastener and drive the washer 114 and the nut 112 in a direction 161, opposite the direction 124. To rotate the tightening element 156, the tightening element 156 may contain a hole 157 which may extend along and/or through the diameter of the tightening element 156. Additionally, the shell 152 may also contain an access point 158 that enables access to the hole 157 of the tightening element 156. Accordingly, a tool 160 may be inserted into the hole 157 and act as a lever to enable rotation of the tightening element 156. As the tightening element 156 rotates in the circumferential direction 159 about the axis 108, the tightening element 156 may apply a torque onto the nut 112 and likewise rotate the nut 112. Although FIG. 6 depicts the tool 160 as an Allen wrench, the tool 160 may be any other component or device that may be inserted into the holes 157 of the tightening element 156.

Figure 7:
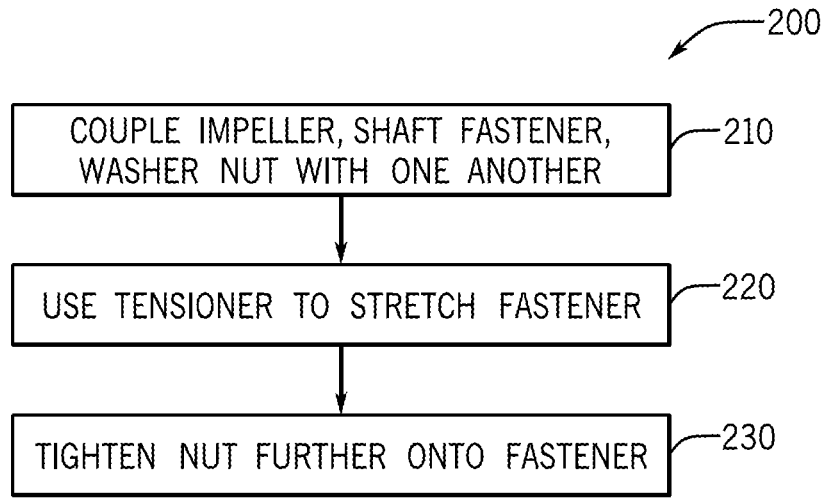
FIG. 7 is a block diagram of an embodiment of a process for coupling the impeller of FIG. 5 to the compressor shaft, in accordance with an aspect of the present disclosure.

FIG. 7 is a flow diagram of an embodiment of a method 200 for securely clamping the impeller 102 onto the shaft 104 by stretching the fastener 106 with the tensioner 150. For example, at block 210, the impeller 102, the shaft 104, the fastener 106, the washer 114, and the nut 112 are coupled to one another. Specifically, the first end 107 of the fastener 106 may be inserted into and threaded into the opening 113 of the shaft 104. Once the first end 107 is inserted, the second end 109 of the fastener 106 remains outside of the shaft 104. A portion 115 of the second end 109 of the fastener 106, may be inserted into the opening 117 of the impeller 102 until the surface 110 of the shaft 104 is in contact with the impeller 102. The washer 114 and the nut 112 may then be coupled to the second end 109 of the fastener 106. In some embodiments, the washer 114 may be inserted until contacting the mounting surface 116. The nut 112 may then be threaded onto the fastener 106 until contacting and clamping down on the washer 114.

At block 220, the fastener 106 is stretched via a tensioner 150. In some embodiments, the tensioner 150 is a hydraulic tensioner. That is, fluid may be delivered to the tensioner 150, such as using a fluid source coupled to the inlet 151 of the tensioner 150. The fluid source may direct fluid to the tensioner 150, thereby generating pressure that ultimately moves the grip 154 in the direction 124. When the grip 154 moves in the direction 124, the grip 154 also stretches the fastener 106 in the direction 124. As the fastener 106 stretches, the washer 114 and the nut 112, which are coupled to the fastener 106, may also move in the direction 124 away from the shaft 104. That is, the washer 114 may no longer be in contact with the impeller 102 at the mounting surface 116. As such, the nut 112 may be further tightened onto the fastener 106 by threading the nut 112 with the tightening element 156 until the washer 114 contacts the mounting surface 116 as shown at block 230. When the fastener 106 is no longer stretched, such as when fluid is released from the tensioner 150 to release pressure within of the tensioner 150, the fastener 106 will compress in the direction 161 and produce a clamping force to further secure the impeller 102 onto the shaft 104. As such, a force of between 25,000 pounds per square inch (psi) and 150,000 psi, between 30,000 and 120,000 psi, or between 35,000 and 100,000 psi may be applied between the impeller 102 and the shaft 104.

Figure 8:
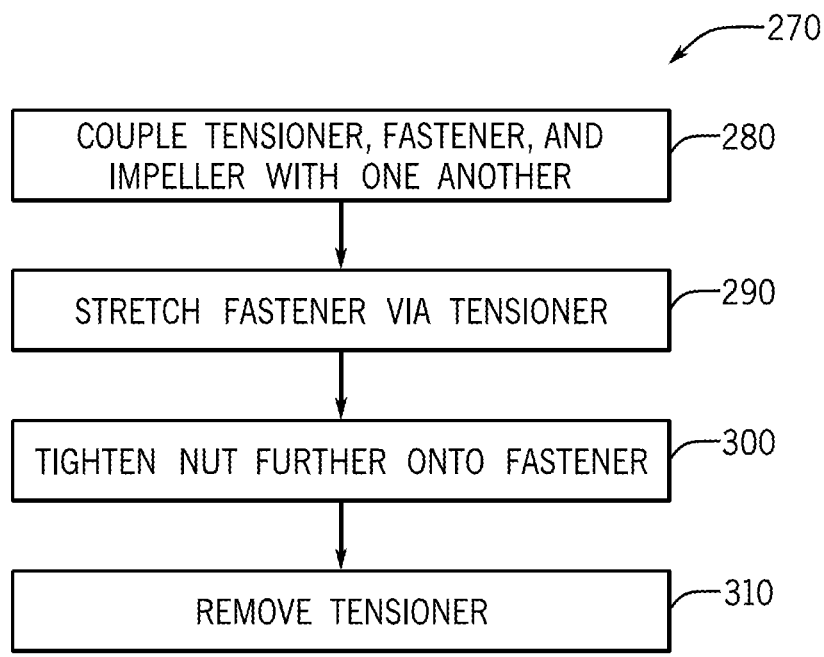
FIG. 8 is a block diagram of an embodiment of a process for stretching a fastener of the impeller system of FIG. 5 using the tensioner of FIG. 6, in accordance with an aspect of the present disclosure.

FIG. 8 is a flow diagram that describes in greater detail an embodiment of a method 270 for stretching the fastener 106 using the tensioner 150 of FIG. 6. At block 280, the tensioner 150 is partially inserted into the opening 117 (e.g., the second diameter portion 120) of the impeller 102 until the shell 152 of the tensioner 150 is in contact with the washer 114. When the tensioner 150 is in contact with the impeller 102, the grip 154 may be coupled to the fastener 106 and the tightening element 156 may be coupled to the nut 112. In some embodiments, the tensioner 150 is a hydraulic tensioner and a fluid source may be coupled to the tensioner 150, such as via inlet 151. Accordingly, the tensioner 150 and the fluid source are in fluid communication with one another.

After coupling the components, the tensioner 150 may stretch the fastener 106, as shown at block 290. For example, the grip 154 of the tensioner 150 may move in the direction 124 and thus, apply an axial force to the fastener 106 and direct the fastener 106 in the same direction 124. In some embodiments, the grip 154 may move due to hydraulic pressure force. That is, fluid may be delivered into the tensioner 150. The fluid may exert pressure within the tensioner 150 to move the member 155 and thereby the grip 154 in the direction 124. Since the grip 154 is coupled to the fastener 106, the grip 154 exerts a tensile force onto the end 109 of the fastener 106, which stretches the fastener 106 in the direction 124. By stretching the fastener 106 in the direction 124, the washer 114 may no longer be in contact with the mounting point 116 of the impeller 102.

Since the washer 114 is no longer in contact with the impeller 102, the nut 112 located directly adjacent to the washer 114 may be tightened against insert into the impeller 102. For example, the tightening element 156 may facilitate rotating the nut 112 to further tighten the impeller 102 against the shaft 104. In some embodiments, the tool 160 may be used to rotate the tightening element 156 in the circumferential direction 159 about the 108 axis, thereby rotating the tightening element 156 as well. Since the tightening element 156 is coupled to the nut 112, rotation of tightening element 156 may transfer torque to the nut 112 to rotate the nut 112. The rotation of the nut 112 may then move the nut 112 in the direction 161 opposite the direction 124, such that the washer 114 moves back into contact with the mounting point 116.

After the nut 112 and the washer 114 are secured against onto the impeller 102, the stretching of the fastener 106 may be released by removing the tensioner 150 as shown at block 310. For example, when the tensioner 150 is a hydraulic tensioner, pressure may be released from inside the tensioner 150 by directing fluid back toward the fluid source, for example. When pressure is released, the grip 154 may attempt to revert back to its starting position by moving in the direction 161 opposite the direction 124. As the grip 154 moves, it compresses the fastener 106 in the direction 161. This compression further applies a clamping force between the impeller 102 and the shaft 104, caused by the washer 114 and the nut 112. After releasing the pressure within the tensioner 150, the tensioner 150 may be decoupled from the impeller 102. In some embodiments, the grip 154 may be decoupled from the fastener 106 and/or the tightening element 156 may be decoupled from the nut 112 prior to the removal of the tensioner 150. After removal of the tensioner 150, the clamping is maintained between the impeller 102 and the shaft 104 to secure the impeller 102 against the shaft 104 during compressor operation.

As set forth above, the present disclosure may provide one or more technical effects useful in the assembly of a compressor of HVAC&R systems. Embodiments of the disclosure may include clamping an impeller onto a shaft using a fastener, a washer, and a nut, and tightening the nut by using a hydraulic tensioner to achieve a predetermined force between the impeller and the shaft. This method for coupling an impeller onto a shaft in a compressor may facilitate assembly of the components. For example, the shaft and the impeller may not undergo precise machining that may have been involved for shafts and impellers that contain keys, splines, and/or pins. Furthermore, the impeller may be more aerodynamic since it may no longer includes the keys, splines, and/or pins. The lack of keys, splines, and/or pins in the assembly may also reduce the moment of inertia of the assembly, which facilitates rotation of the impeller. This reduction in moment of inertia may result in less power required to rotate the shaft and the impeller, which may reduce energy costs. As such, the present disclosure may benefit the fabrication, assembly, and operation of the compressor. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A compressor for a heating, ventilating, air conditioning, and refrigeration (HVAC&R) unit, comprising:
   an impeller, wherein the impeller comprises an opening, wherein the impeller does not comprise keys, splines, pins, or any combination thereof, and wherein the opening extends through a center of a surface of the impeller;
   a shaft configured to rotate the impeller; and
   a fastener coupled to an end of the shaft and extending through the opening of the impeller, wherein the fastener is configured to stretch in an axial direction relative to the shaft via a tensioner during assembly of the compressor.

2. The compressor of claim 1, wherein the fastener is a threaded stud, a tie bolt, or any combination thereof.

3. The compressor of claim 1, comprising a washer configured to be disposed against the surface of the impeller, and wherein the fastener is configured to extend through the washer.

4. The compressor of claim 3, comprising a nut configured to couple to the fastener via threads.

5. The compressor of claim 4, wherein the threads comprise first threads of the nut having a pitch of looser tolerance than second threads of the fastener to accommodate the stretching of the fastener.

6. The compressor of claim 5, wherein the nut is configured to be further tightened along the fastener while the fastener is stretched.

7. The compressor of claim 4, wherein the opening comprises a first diameter and a second diameter, wherein the first diameter is smaller than the second diameter, and wherein the first diameter is smaller than a third diameter of the nut.

8. The compressor of claim 1, wherein a friction modifier is disposed on an additional surface between the impeller and the shaft.

9. The compressor of claim 1, wherein the fastener and the shaft comprise high strength steel.

10. The compressor of claim 1, wherein the fastener comprises a non-threaded length of reduced diameter in between two ends of the fastener.

11. A method of coupling an impeller to a shaft for a compressor, comprising:
    inserting a fastener through an opening of the impeller, wherein a rotational axis of the impeller extends through the opening, and a first end of the fastener is coupled to a second end of the shaft;
    coupling a nut to a third end of the fastener such that the nut is disposed against a surface of the impeller;
    stretching the fastener in an axial direction away from the shaft via a tensioner disposed against the impeller, wherein the tensioner comprises a grip configured to couple to the fastener and a tightening element configured to couple to the nut; and
    tightening the nut along the fastener while the fastener is in a stretched position.

12. The method of claim 11, wherein tightening the nut along the fastener while the fastener is in the stretched position comprises rotating the tightening element to further thread the nut onto the fastener until the nut is biased against the surface of the impeller.

13. The method of claim 11, wherein stretching the fastener comprises directing fluid into the tensioner to direct the grip in the axial direction away from the shaft.

14. The method of claim 11, comprising compressing the fastener in an axial direction towards the shaft after tightening the nut along the fastener when the fastener is in the stretched position.

15. A system to couple an impeller to a shaft of a compressor, comprising:
    a fastener configured to couple to an end of the shaft at a first end of the fastener, wherein the fastener is a threaded stud, a tie bolt, or any combination thereof, and the fastener is configured to extend into an opening of the impeller;
    a nut configured to couple to the fastener at a second end of the fastener; and
    a tensioner configured to stretch the fastener, wherein the tensioner is configured to be positioned within the opening of the impeller and disposed against a surface of the impeller.

16. The system of claim 15, wherein the tensioner comprises a grip configured to couple to the second end of the fastener, and wherein the tensioner is configured to move in an axial direction via fluid pressure to stretch the fastener.

17. The system of claim 15, wherein the tensioner comprises a tightening element configured to couple to the nut and configured to rotate.

18. The system of claim 15, wherein the fastener is coupled to the shaft via threads.

* * * * *